(12) United States Patent
Daly et al.

(10) Patent No.: US 6,491,486 B1
(45) Date of Patent: Dec. 10, 2002

(54) STRADDLING DOWEL

(75) Inventors: Aaron Daly, Waldachtal (DE); Roland Graf, Horb (DE)

(73) Assignee: fischerwerke Artur Fischer GmbH & Co. KG, Waldachtal (DE)

(*) Notice: Subject to any disclaimer, the term of this patent is extended or adjusted under 35 U.S.C. 154(b) by 0 days.

(21) Appl. No.: 09/856,203

(22) PCT Filed: Nov. 4, 1999

(86) PCT No.: PCT/EP99/08444
§ 371 (c)(1),
(2), (4) Date: May 18, 2001

(87) PCT Pub. No.: WO00/37809
PCT Pub. Date: Jun. 29, 2000

(30) Foreign Application Priority Data

Dec. 21, 1998 (DE) ........................................ 198 59 220

(51) Int. Cl.⁷ ................................................ F16B 13/14
(52) U.S. Cl. .......................................... 411/80.5; 411/33
(58) Field of Search ............................... 411/80.1–80.6, 411/33, 21, 61

(56) References Cited

U.S. PATENT DOCUMENTS

| | | | | |
|---|---|---|---|---|
| 1,021,390 A | * | 3/1912 | Wagner | |
| 1,168,770 A | * | 1/1916 | Wagner | |
| 2,240,716 A | | 5/1941 | Henry | |
| 2,720,135 A | * | 10/1955 | Gisondi | |
| 3,910,156 A | * | 10/1975 | Soltysik | |
| 4,182,218 A | * | 1/1980 | Combette | |
| 5,143,497 A | * | 9/1992 | Haage | |
| 5,224,805 A | * | 7/1993 | Moretti | |
| 5,431,516 A | * | 7/1995 | Haage | |
| 5,938,385 A | * | 8/1999 | Garfield | |

FOREIGN PATENT DOCUMENTS

| | | |
|---|---|---|
| DE | 30 17 108 A | 11/1981 |
| DE | 34 16 797 A | 11/1985 |
| DE | 43 17 039 A1 | 11/1994 |

* cited by examiner

Primary Examiner—Flemming Saether
(74) Attorney, Agent, or Firm—Michael J. Striker

(57) ABSTRACT

The invention relates to an expansible fixing plug (10) having an expansion region. To achieve a high anchoring force, the invention proposes constructing the expansible fixing plug (10) in the expansion region with two circumferential wall portions (18) arranged lying opposite one another, each of which extends over about 180° and from the insides of which expansion ribs (20) project inwards, the inner edges (22) of which expansion ribs form a semicircular arc and by which an expansion channel (24) that is continuous in the lengthwise direction of the expansible fixing plug (10) is constricted to a lens shape. By screwing an expansion screw into the expansion channel (24), the expansible fixing plug (10) is expanded.

9 Claims, 4 Drawing Sheets

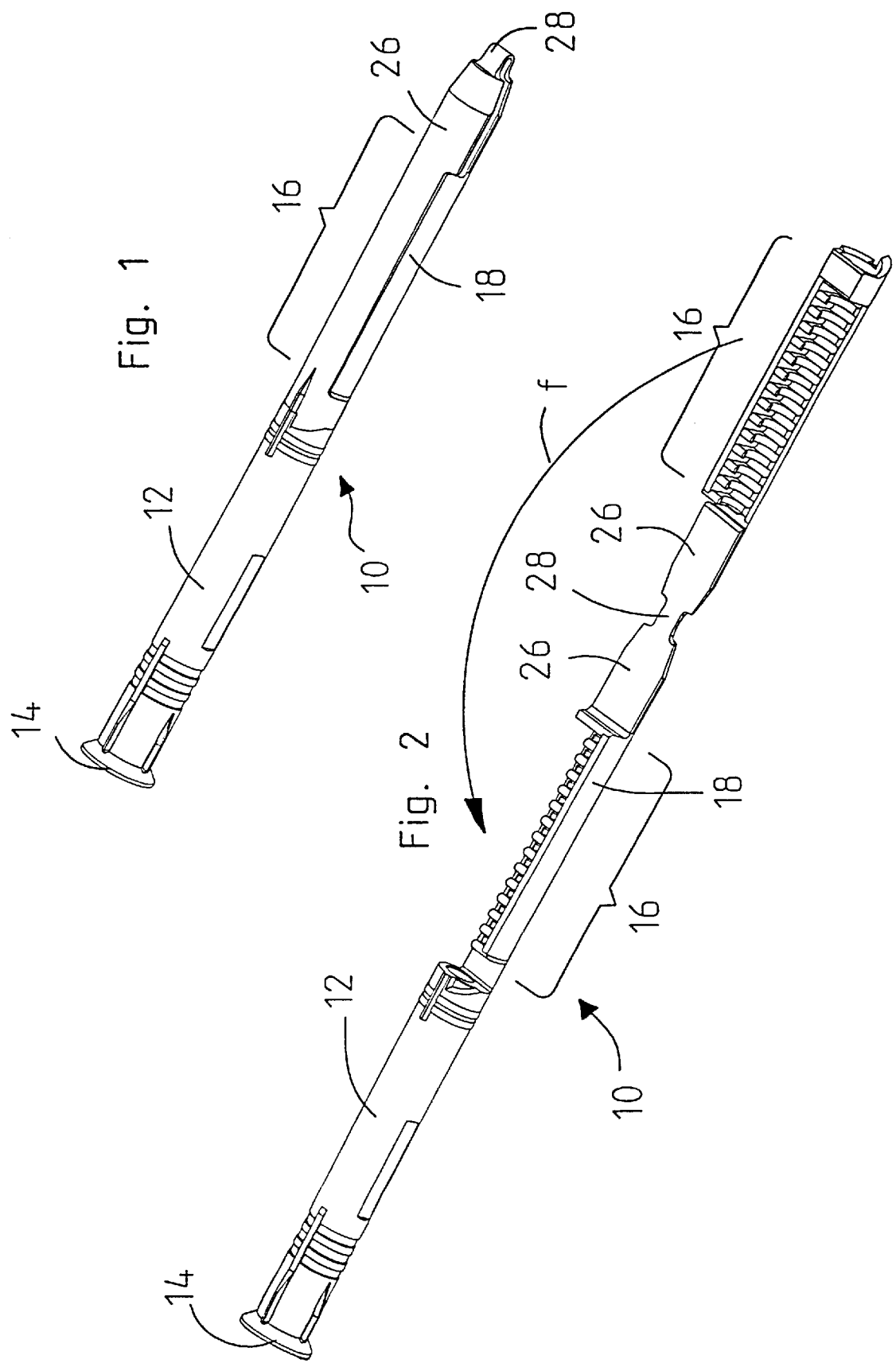

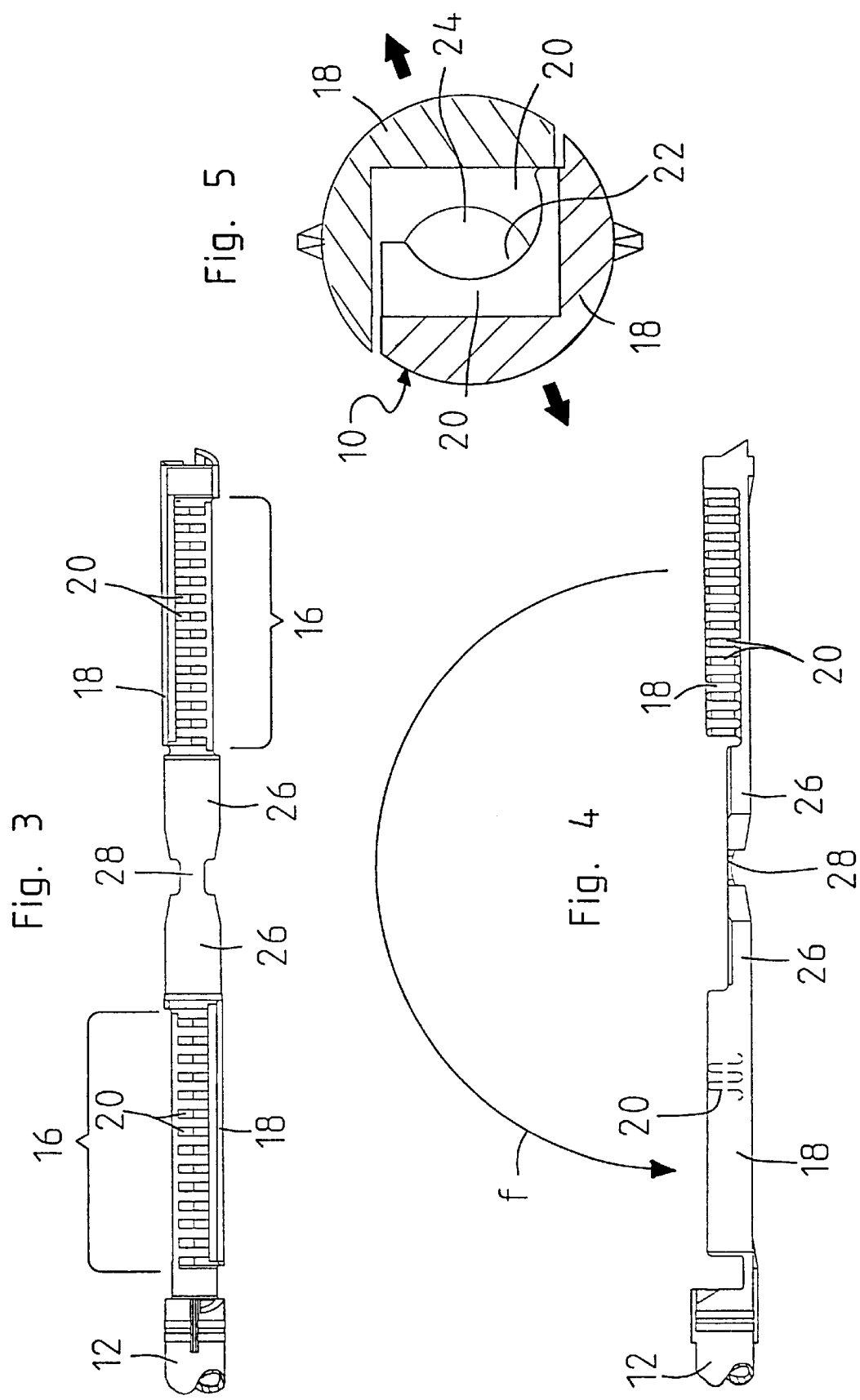

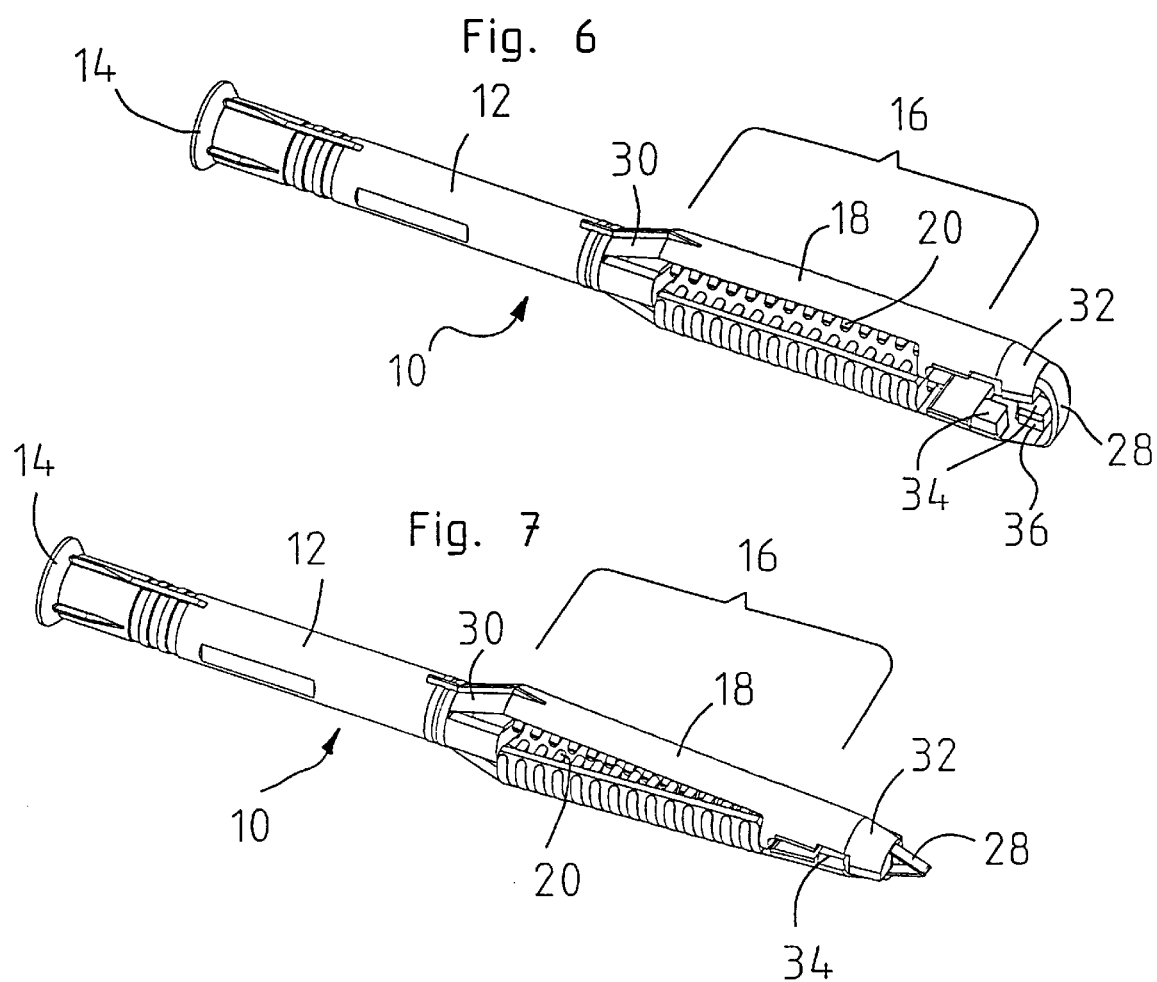

STRADDLING DOWEL

The invention relates to an expansible fixing plug.

Such an expansible fixing plug is known from DE 43 17 039 A1. The known expansible fixing plug has disc-shaped expansion elements in an expansion region extending over part of the length of the expansible fixing plug, the disc-shaped expansion elements being arranged perpendicularly to the lengthwise direction of the expansible fixing plug. The expansion elements are provided with an expansion hole passing through them in the lengthwise direction of the expansible fixing plug, the expansion hole being arranged eccentrically in the disc-shaped expansion elements. In this connection, the expansion holes of adjacent expansion elements are arranged offset in opposing directions in the expansion elements. The expansion holes in the expansion elements form in the expansion region of the expansible fixing plug an expansion channel, which is constricted by the expansion holes arranged eccentrically alternately in opposite directions. To expand the known expansible fixing plug, a pin-shaped expansion element, for example, an expansion nail or an expansion screw, is inserted in the expansion channel of the expansible fixing plug. The pin-shaped expansion element aligns the expansion holes in the expansion elements so that they lie on the same axis as one another, the disc-shaped expansion elements being displaced in the radial direction of the expansible fixing plug. In the process, adjacent expansion elements are displaced in opposite directions. The expansible fixing plug is consequently expanded and anchored in a drilled hole.

For fixing the expansion elements, in its expansion region the known expansible fixing plug has two longitudinally extending fixing webs, which are arranged opposite one another at the circumference of the expansible fixing plug. The disc-shaped expansion elements are each connected to a fixing web, from which they project at right angles towards the other fixing web. In this connection, every other expansion element is connected to one fixing web and the expansion element in between is connected to the other fixing web, so that the disc-shaped expansion elements are interleaved. The fixing webs are arranged at right angles to the direction in which the expansion holes are arranged eccentrically in the expansion elements. As the expansible fixing plug is expanded, the fixing webs are displaced parallel to one another in opposite directions and are not expanded radially apart. As the expansible fixing plug is expanded, the expansion elements, not the fixing webs, are therefore pressed directly with their circumferential edge against the wall of a drilled hole.

The invention is based on the problem of proposing an expansible fixing plug of the kind mentioned in the introduction having increased anchoring force (withdrawal force) in a hole drilled in masonry.

That problem is solved in accordance with the present invention. The expansible fixing plug according to the invention has expansion ribs as expansion elements, which are arranged approximately in radial planes of the expansible fixing plug and which enclose the expansion channel for part of the circumference of the expansible fixing plug. In this connection, expansion ribs adjacent to one another in the lengthwise direction of the expansible fixing plug are arranged at different points on the circumference, for example, opposite one another. Inner edges of the expansible ribs define the expansion channel at the circumference thereof and constrict the expansion channel. By inserting a pin-shaped expansion element, the expansion ribs are pressed radially apart in different directions and hence the expansible fixing plug is expanded. Constriction within the meaning of the invention shall be understood to mean that the expansion channel defined by the inner edges of the expansion ribs has a smaller inside width than a transverse dimension or diameter of the pin-shaped expansion element that is used to expand the expansible fixing plug.

The expansion ribs are fixed to circumferential wall portions, each of which extends only for part of the circumference of the expansible fixing plug and which together at least approximately completely close the expansible fixing plug circumferentially in the unexpanded state of the expansible fixing plug. The expansion ribs project inwards from the inner sides of the circumferential wall portions, adjacent expansion ribs being disposed on different circumferential wall portions. The expansion ribs are interleaved, to the extent that they overlap one another viewed in the lengthwise direction of the expansible fixing plug.

To expand the expansible fixing plug according to the invention, a pin-shaped expansion element is introduced into the expansion channel of the expansible fixing plug. This expansion element presses the expansion elements radially apart in different directions, with the result that the circumferential wall portions, from which the expansion ribs project inwards, are likewise pressed apart, that is, are expanded. By inserting the expansion element into the expansion channel, the circumferential wall portions are pressed radially apart. In a drilled hole, the circumferential wall portions are pressed against a wall of the drilled hole and the expansible fixing plug is consequently wedged and anchored in the drilled hole. Since the expanded circumferential wall portions abut the wall of the drilled hole virtually over the entire circumference and over the entire length, the result is a large-area, virtually full-face contact with the wall of the drilled hole, which produces a high holding and anchoring force. In porous building materials, such as gas concrete, or in hollow building materials, such as cavity blocks, the large-area contact with the wall of the drilled hole leads to a low load per area unit and hence also to a high holding and anchoring force.

A further advantage of the expansible fixing plug according to the invention is that its expansion ribs abut the pin-shaped expansion element only for part of the circumference and do not completely surround the pin-shaped expansion element. This leads to reduced resistance to driving in, in the case of an expansion screw as the expansion element, to a reduced driving-in torque for the same expansion of the expansible fixing plug.

The expansible fixing plug according to the invention is preferably divided in the expansion region into two circumferential wall portions, from which the expansion ribs project inwards. The circumferential wall portions and the expansion ribs encircle the expansion element that can be inserted between them to an angle of contact of about 180°. It is nevertheless possible for the expansible fixing plug to be constructed in the expansion region with more than two circumferential wall portions. To guide the pin-shaped expansion element, in one construction of the invention the expansible fixing plug comprises a shank barrel closed all round, which guides the pin-shaped expansion element axially. For pre-assembly, the pin-shaped expansion element can be introduced at little way into the shank barrel and be held there by positive and/or non-positive engagement. The pre-inserted expansion element does not extend into the expansion region, so that the expansible fixing plug is not expanded. The already pre-inserted expansion element simplifies manipulation of the expansible fixing plug.

To enable the expansible fixing plug according to the invention to be manufactured from plastics material as an injection-moulded part, one construction of the invention provides for the circumferential wall portions to be joined to one another so as to articulate by means of a film hinge. The film hinge is a thin plastics material skin, which joins the circumferential wall portions to one another and which acts a hinge by virtue of its thin construction and the flexibility of the plastics material and allows the circumferential wall portions to articulate. The circumferential wall portions can be injection moulded arranged in a line one behind the other or laterally next to one another and after removal from the mould are closed together so that their expansion ribs become interleaved. One circumferential wall portion is preferably directly integrally connected with the shank barrel, and the other circumferential wall portion is indirectly connected to the shank barrel by means of the film hinge and the other circumferential wall portion. After being closed together, the other circumferential wall portion can be connected to the shank barrel, for example, by ultrasonic welding.

In another construction of the invention, in a starting or original state of the expansible fixing plug following injection moulding, the circumferential wall portions, on the inner sides of which the expansion ribs are mounted, are arranged spaced from one another by a distance such that the expansion ribs are not, or only slightly, interleaved. Between the circumferential wall portions and passing transversely right through the expansible fixing plug there is therefore between the expansion ribs an uninterrupted space, which allows an injection moulding tool to be opened and the expansible fixing plug according to the invention to be removed after injection moulding. The circumferential wall portions can be arranged parallel to one another. Following removal from the mould, the circumferential wall portions can be pressed so far together that the expansion ribs become interleaved and the expansible fixing plug can be inserted in a drilled hole. This construction of the invention enables the expansible fixing plug to be injection moulded in one piece in a single operation. After injection moulding, the circumferential wall portions need merely to be pressed together, which can possibly be effected by insertion of the expansible fixing plug in the drilled hole. The circumferential wall portions do not need to be closed together. Another advantage of this construction of the invention is that the circumferential wall portions do not have to be joined at their ends to one another or to a shank barrel or the like, for example, by ultrasonic welding.

To be able to join the circumferential wall portions together so that they can be pressed together, that is, so that they are movable, one construction of the invention comprises movable connecting elements at one end of the circumferential wall portions, by means of which the circumferential wall portions are connected in one piece with a shank barrel of the expansible fixing plug. The connecting elements can be webs or the like, which have the required mobility by virtue of their resilience.

In one construction of the invention, the circumferential wall portions comprise snap-fit or locking elements, with which the circumferential wall portions can be connected to one another in the pressed-together state. The snap-fit or locking elements are preferably arranged on the leading or insertion end of the expansible fixing plug remote from the shank barrel. In this construction of the invention, after removal of the expansible fixing plug from an injection moulding tool, the circumferential wall portions are pressed together at the leading end of the expansible fixing plug, so that they interlock with one another there. Towards the rear in the direction of the shank barrel, the circumferential wall portions stand obliquely apart. With the circumferential wall portions held together at its leading end by the snap-fit or locking elements, the expansible fixing plug can be introduced into a drilled hole, the circumferential wall portions being pressed together by the drilled hole for their entire length so that the expansion ribs become interleaved. This construction of the invention has the advantage that, after removal of the expansible fixing plug from the mould and before insertion in a drilled hole, only the circumferential wall portions at the leading end of the expansible fixing plug are pressed together until the snap-fit or locking elements engage, and the expansible fixing plug is then ready for use.

In one construction of the invention the circumferential wall portions are connected to one another via a film hinge.

The invention is explained in detail hereinafter with reference to an exemplary embodiment illustrated in the drawings, in which:

FIG. 1 is a perspective view of an expansible fixing plug according to the invention;

FIG. 2 is a perspective view of the expansible fixing plug of FIG. 1 in its opened-out state;

FIG. 3 is an enlarged view of an expansion region of the expansible fixing plug of FIG. 1 in its opened-out state;

FIG. 4 is a view corresponding to FIG. 3 in a direction of viewing rotated through 90°;

FIG. 5 is a cross-section through an expansion region of the expansible fixing plug of FIG. 1;

FIG. 6 is a perspective view of a second embodiment of an expansible fixing plug according to the invention in the state in which it is removed from the mould;

FIG. 7 shows the expansible fixing plug of FIG. 6 in a locked state;

Figure 8:
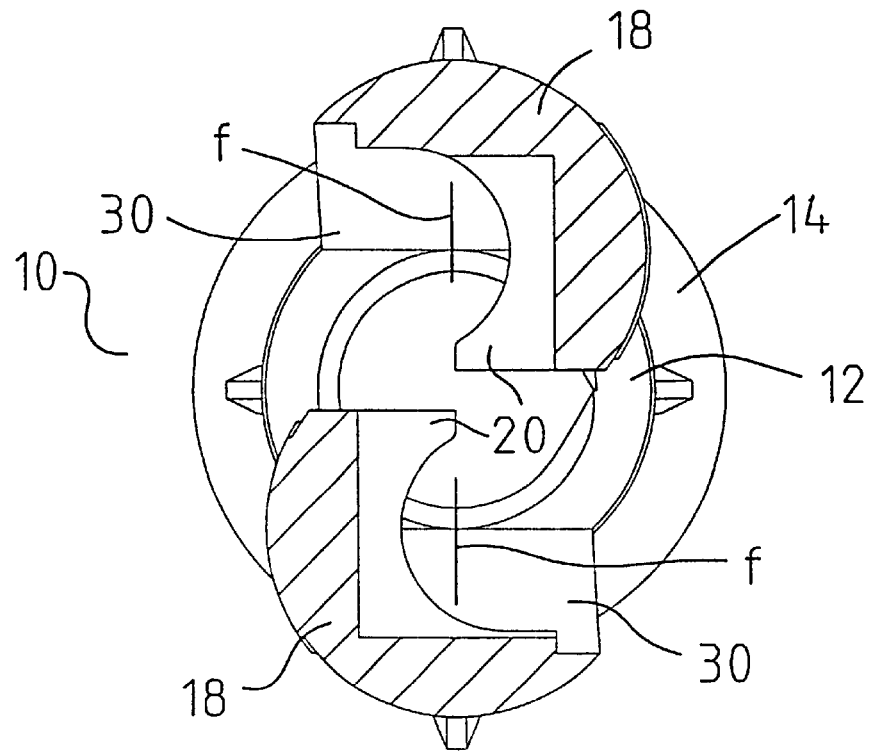
FIG. 8 is a cross-section through an expansion region of the expansible fixing plug of FIG. 6.

The expansible fixing plug 10 illustrated in FIG. 1 is manufactured in one piece as an injection-moulded part of plastics material. It comprises a shank barrel 12 with a funnel-shaped collar 14 for receiving the head of a countersunk head screw, not shown, at one end of the shank barrel 12. Adjoining the other end of the shank barrel 12 is an expansion region 16, in which the expansible fixing plug 10 has two circumferential wall portions 18 running in the lengthwise direction. The two circumferential wall portions 18 extend over a circumferential angle of about 180° and are arranged opposite one another, so that jointly they complement each other to provide a circumferential angle of 360°, as can readily be appreciated in FIG. 5.

In FIGS. 2 to 4, the expansible fixing plug 10 is shown in its opened-out state. On their insides, the circumferential wall portions 18 have expansion ribs 20, which extend, like the circumferential wall portions 18, over a circular arc of about 180° (FIG. 5). The expansion ribs 20 project at right angles from the circumferential wall portions 18 and are located in radial planes of the expansible fixing plug 10. The expansion ribs 20 of one circumferential wall portion 18 are arranged at a distance apart from one another that corresponds approximately to their thickness or is somewhat larger. By folding the two circumferential wall portions 18 together, the expansion ribs 20 engage between one another so that they are interleaved, so that in each case an expansion rib 20 that is integral with one of the two circumferential wall portions 18 is located between two expansion ribs 20 that are integral with the other circumferential wall portion 18. The expansion ribs 20 have a semi-circular inner edge 22, the hypothetical midpoint of which is arranged offset eccentrically with respect to the expansible fixing plug 10 in the direction of that circumferential wall portion 18 with which that particular expansion rib 20 is not connected. The expansion ribs 20 therefore define with their inner edges 22 an expansion channel 24 extending in the lengthwise direction of the expansible fixing plug 10, which channel is constricted in a lens shape, as is clearly apparent from FIG. 5.

At the leading end, the circumferential wall portions 18 change into expansion tongues 26, which have approximately a semi-circular cross-section and in which no expansion channel is formed. At their leading ends, the two expansion tongues 26 are connected to one another so as to articulate by way of a film hinge 28. The film hinge 28 is a thin plastics material skin, which acts as a hinge and allows the two expansion tongues 26 and the circumferential wall portions 18 with the expansion ribs 20 to articulate. This ability to articulate enables the two circumferential wall portions 18 to be folded together, as indicated by arrow f in FIGS. 2 and 4, so that the expansion ribs 20 of the two circumferential wall portions 18 become interleaved and the expansion channel 24 visible in FIG. 5 is formed.

To be able to manufacture the expansible fixing plug 10 in one piece from plastics material by injection moulding, the expansible fixing plug 10 is manufactured in the extended state illustrated in FIGS. 2 to 4. After injection moulding and removal from the mould, the two circumferential wall portions 18 are folded together about the film hinge 28, so that the expansion ribs 20 interleave and form the channel 24 constricted in a lens shape between their inner edges 22. The folded-together state is shown in FIGS. 1 and 5. For expansion, an expansion screw, not shown, which has preferably already been screwed into the shank barrel 12, is screwed in through the shank barrel 12 into the expansion channel 24 between the expansion ribs 20. The expansion screw presses the expansion ribs 20, and consequently the circumferential wall portions 18, apart. The expansible fixing plug 10 is in this way expanded in its expansion region in the direction of the two arrows in FIG. 5, and can thus be anchored in a drilled hole. Since the two circumferential wall portions 18 together take up virtually the entire circumference of the expansible fixing plug 10, the expanded expansible fixing plug 10 lies in virtually full-face contact with the wall of a drilled hole, not shown. A high anchoring and withdrawal force is therefore achieved.

One of the two circumferential wall portions 18 is joined directly and integrally to the shank barrel 12. After folding together the two circumferential wall portions 18, the circumferential wall portion 18 not joined directly to the shank barrel 12 is welded to the shaft barrel 12 by ultrasonic welding. As it is screwed in, the expansion screw, once it has been screwed through all expansion ribs 20, enters between the expansion tongues 26 and spreads these apart, whereby the anchoring force of the expansible fixing plug 10 is additionally increased. The expansion screw is able to pierce the film hinge 28 and break it open, which does not impair anchoring of the expansible fixing plug 10 in the drilled hole.

FIG. 6 shows a second embodiment of an expansible fixing plug 10 according to the invention. This too, like the expansible fixing plug 10 illustrated in FIGS. 1 to 5, has a shank barrel 12 with a funnel-shaped collar 14. The expansible fixing plug 10 illustrated in FIG. 6 also has two circumferential wall portions 18 extending in the lengthwise direction, on the insides of which circumferential wall portions, expansion ribs 20 are arranged in radial planes with respect to the expansible fixing plug 10. In this respect, the expansible fixing plug 10 illustrated in FIG. 6 is of identical construction with and functions in the same way as the expansible fixing plug 10 illustrated in FIGS. 1 to 5 and explained above. To avoid repetition, the reader is referred to the preceding explanations of the expansible fixing plug 10; identical reference numbers have been used for identical components. The differences of the expansible fixing plug 10 illustrated in FIG. 6 from the expansible fixing plug 10 already described and illustrated in FIGS. 1 to 5 are explained below.

FIG. 6 shows the expansible fixing plug 10 in the state after injection moulding. The circumferential wall portions 18 extending in the lengthwise direction of the expansible fixing plug 10 are parallel to one another and are arranged a distance apart from one another such that the expansion ribs 20 arranged on their insides do not mesh with one another. In the expansion region 16, there is an intermediate space between the expansion ribs 20; this space is uninterrupted in the lengthwise direction of the expansible fixing plug 10, passes transversely right through the expansible fixing plug 10 and enables the expansible fixing plug 10 manufactured in one piece by injection moulding to be removed from the mould. FIG. 8 shows a cross-section (in the expansion region 16) of the expansible fixing plug 10 in the state of the expansible fixing plug 10 after injection moulding illustrated in FIG. 6. The intermediate space between the expansion ribs 20, which enables the expansible fixing plug 10 to be removed from the mould after injection moulding, can be seen in FIG. 8.

The two circumferential wall portions 18 are arranged so that they can be pressed together at the expansible fixing plug 10 in the transverse direction of the expansible fixing plug 10, as indicated in FIG. 8 by the arrows f$^1$. To be able to press the circumferential wall portions 18 together, at their ends facing the shank barrel 12 these are integrally joined by means of web-like joining elements 30 with the shank barrel 12. The joining elements 30 project from the shank barrel 12 obliquely outwards towards the leading end of the plug and are deformable at the transition to the shank barrel 12 and to the circumferential wall portions 18 in the manner of a hinge. At their ends remote from the shank barrel 12, the circumferential wall portions 18 are joined to one another by way of a film hinge 28 so that they can be pressed together. By pressing the circumferential wall portions 18 together in the direction of the arrows f$^1$ in FIG. 8, the expansion ribs 20 become interleaved, as illustrated in FIG. 5. After pressing together the circumferential wall portions 18, the expansible fixing plug 10 illustrated in FIG. 6 can be used just like the expansible fixing plug 10 illustrated in FIGS. 1 to 5. Pressing together the circumferential wall portions 18 can be effected after removal of the expansible fixing plug 10 from the mould and before insertion of the expansible fixing plug 10 in a drilled hole or even by inserting the expansible fixing plug 10 in a drilled hole.

$^1$There are lines marked f, but no arrows—translator.

At their leading end remote from the shank barrel 12, the circumferential wall portions 18 have a truncated taper 32, which, where appropriate in conjunction with the arc-shaped or arrow-shaped film hinge 28, causes the circumferential wall portions 18 to b pressed together as the expansible fixing plug 10 is inserted in a drilled hole. Compared with the expansible fixing plug 10 illustrated in FIGS. 1 to 5, transformation of the expansible fixing plug 10 illustrated in FIG. 6 into the state in which it is ready for use is simplified, since the circumferential wall portions 18 do not have to be folded together but merely pressed together, which is simpler, especially in automated production. Furthermore, the joining of the circumferential wall portion 18 with the shank barrel 12 is omitted, since, in the case of the expansible fixing plug 10 illustrated in FIG. 6, both circumferential wall portions 18 are joined to the shank barrel 12 by way of the joining elements 30.

Figure 9:
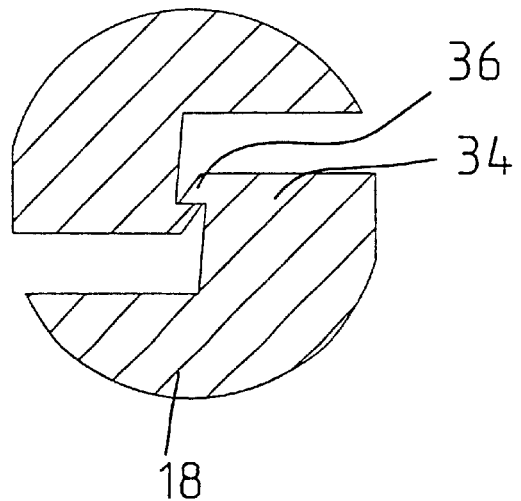
FIG. 9 is a cross-section through the leading end of the expansible fixing expansible fixing plug of FIG. 6.

To hold the circumferential wall portions 18 together after they have been pressed together, and to hold the expansion ribs 20 interleaved, the expansible fixing plug 10 illustrated in FIG. 6 has locking elements 34. The locking elements 34 can be clearly seen in cross-section in FIG. 9. In FIG. 9, only the cross-sectional areas are illustrated and elements of the expansible fixing plug 10 visible behind the sectional plane itself, such as the expansion ribs 20, the circumferential wall portions 18 and the shank barrel 12, have been omitted for the sake of clarity. The locking elements 34 are in the form of blocks formed integral with the circumferential wall portions 18, which are arranged laterally of a hypothetical central longitudinal plane of the expansible fixing plug 10. Extending to the side from the locking elements 34 are locking projections 36, which interlock when the circumferential wall portions 18 are pressed together and hold the circumferential wall portions 18 together. The locking elements 34 do not hinder expansion of the expansible fixing plug 10, since the circumferential wall portions 18 deform when an expansion screw is screwed in and additionally the expansion screw causes the locking elements 34 to disengage without any trouble.

In the exemplary embodiment of the invention illustrated, the locking elements 34 are provided only at the leading end of the circumferential wall portions 18, two pairs of locking elements 34 being arranged in succession and opposite one another in the lengthwise direction of the expansible fixing plug 10. The locking elements 34 hold the circumferential wall portions 18 together at the leading end of the expansible fixing plug 10, so that the circumferential wall portions 18 are held together only at the leading end of the expansible fixing plug 10 and assume an arrow-like orientation obliquely with respect to one another, as illustrated in FIG. 7. At the transition to the shank barrel 12, the circumferential wall portions 18 are spaced from one another. In the state illustrated in FIG. 7, the expansible fixing plug 10 can be inserted without difficulty into a drilled hole and anchored there; the circumferential wall portions 18 are pressed together by the drilled hole as the plug is inserted in the drilled hole. The advantage of this construction of the invention is that, up until screwing in of the expansion screw, the expansible fixing plug 10 can grip even in an oversize drilled hole by virtue of the circumferential wall portions 18 extending outwards at the transition to the shank barrel 12. Before being expanded, the expansible fixing plug 10 does not even fall out of an unduly oversized hole drilled in a ceiling. Locking elements 34, as illustrated in FIG. 9, can also be provided (although this is not illustrated) at another point of the expansion region 16 and/or at the transition to the shank barrel 12.

What is claimed is:

1. An expansible fixing plug having an expansion region extending in the lengthwise direction and an expansion channel running in the lengthwise direction, into which channel a pin-shaped expansion element can be introduced in order to expand the expansible fixing plug, the expansible fixing plug comprising expansion elements arranged substantially at right angles to the lengthwise direction of the expansible fixing plug and interleaving with one another in the expansion region, wherein the expansion elements are in the form of expansion ribs (20), inner edges (22) of the expansion ribs (20) defining and constricting the expansion channel (24) at the circumference thereof in the expansion region (16) of the expansible fixing plug (10), wherein the inner edge (22) of each of the expansion ribs (20) extends only over part of the circumference of the expansion channel (24), such that all of the expansion ribs (20) together form the expansion channel (24) over its entire circumference, and the expansion ribs (20) are disposed on the inside of the circumferential wall portions (18) of the expansible fixing plug (10), each circumferential wall portion (18) extending only over a part of the circumference of the expansible fixing plug (10), and wherein all circumferential wall portions (18) together substantially close the expansible fixing plug (10) circumferentially.

2. An expansible fixing plug according to claim 1, wherein the expansible fixing plug (10) comprises two circumferential wall portions (18).

3. An expansible fixing plug according to claim 2, wherein the inner edges (22) of the expansion ribs (20) and the circumferential wall portions (18) extend over an angle of about 180° circumferentially.

4. An expansible fixing plug according to claim 1, wherein the expansible fixing plug (10) comprises a circumferentially closed shank barrel (12), wherein said shank barrel (12) is one piece with at least one circumferential wall portion (18).

5. An expansible fixing plug according to claim 1, wherein the circumferential wall portions (18) are connected to one another so as to articulate by means of a film hinge (28).

6. An expansible fixing plug according to claim 1, wherein the circumferential wall portions (18) are arranged spaced from one another by a distance such that the expansion ribs do not, or only slightly, mesh with one another, and the circumferential wall portions (18) can be pressed together.

7. An expansible fixing plug according to claim 6, wherein the expansible fixing plug (10) comprises a shank barrel (12), with which the circumferential wall portions (18) are joined in one piece and so that they can be pressed together by means of movable joining elements (30).

8. An expansible fixing plug according to claim 6, wherein the circumferential wall portions (18) comprise snap-fit or locking elements (34, 36), with which they are joined to one another in a pressed-together state.

9. An expansible fixing plug according to claim 6, wherein the circumferential wall portions (18) are joined to one another by means of a film hinge (28).

* * * * *